Dec. 11, 1923.
A. LAURIE
SCOOP ATTACHMENT FOR TRACTION ENGINES
Filed Sept. 27, 1921
1,477,136
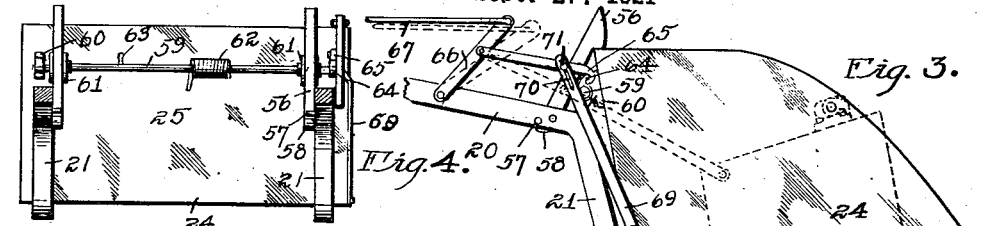
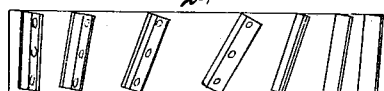
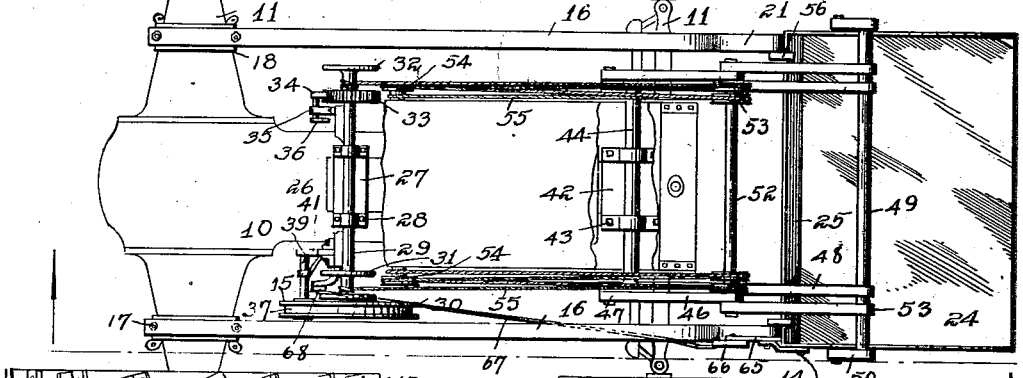
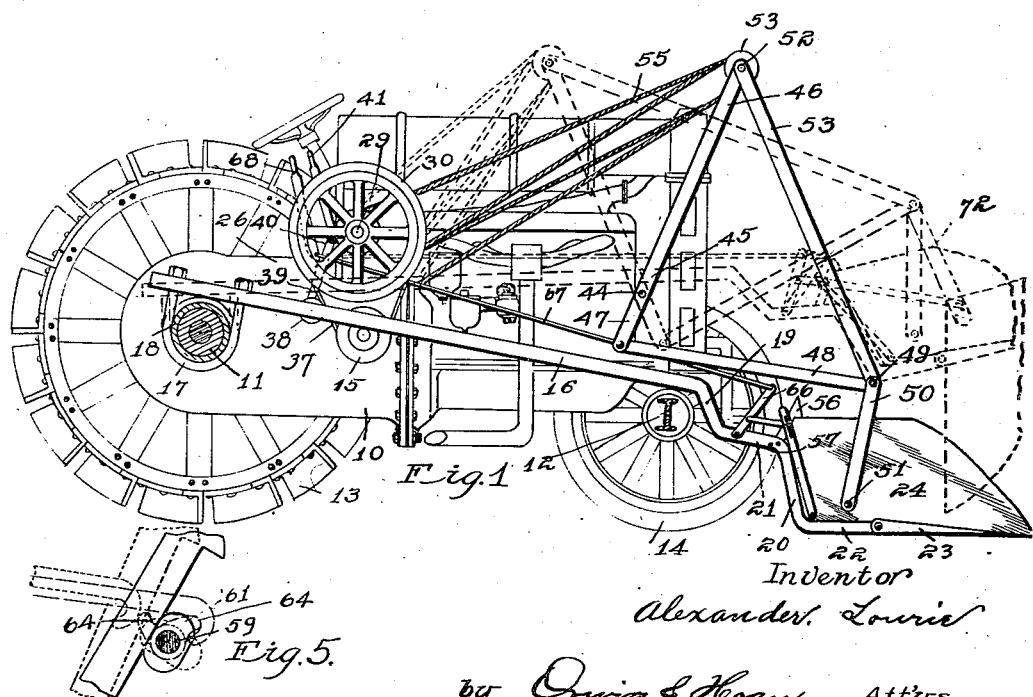
Inventor
Alexander Laurie
by Orwig & Hague, Att'ys Patented Dec. 11, 1923.

1,477,136

UNITED STATES PATENT OFFICE.

ALEXANDER LAURIE, OF DES MOINES, IOWA.

SCOOP ATTACHMENT FOR TRACTION ENGINES.

Application filed September 27, 1921. Serial No. 503,645. REISSUED

*To all whom it may concern:*

Be it known that I, ALEXANDER LAURIE, a citizen of the United States, and resident of Des Moines, in the county of Polk and State of Iowa, have invented a certain new and useful Scoop Attachment for Traction Engines, of which the following is a specification.

The object of my invention is to provide a device or mechanism in the nature of an attachment for small farm tractors, which is adapted to gather and convey material from one point to another such as dirt or gravel, the mechanism of the device to be operated from the belt pulley of the tractor.

A further object is to provide a mechanical operated scoop for handling dirt and the like of simple, durable and inexpensive construction, which may be easily and quickly attached to a farm tractor without altering any of the parts of the said tractor, and adapted to be driven by power therefrom.

A further object is to provide in mechanically operated scoop device designed to be detachably connected to a tractor and operated by power from said tractor, improved means for elevating and dumping the scoop.

A still further object is to provide in a mechanically operated scoop of the class above referred to, having a pivoted scoop member, improved means for locking the scoop member in a normal position relative to a supporting frame, and also improved means for returning the scoop to its normal position after it has been dumped.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a farm tractor with its near wheels removed, showing my improved scoop device attached thereto.

Figure 2 is a plan elevation of Figure 1 with portions of the fuel tank broken away to show certain bearings of the scoop mechanism, and the manner in which the same are mounted.

Figure 3 is a detail end elevation of my improved scoop showing in detail certain mechanism for operating and locking said scoop.

Figure 4 is an end elevation of Figure 3.

Figure 5 is a detail sectional view showing the cam device for releasing the scoop retaining hooks, and also the mechanism for operating said cam in dotted lines.

The numeral 10 indicates a farm tractor which may be preferably of any of the small types of tractors, and is provided with a rear axle 11 and a front axle 12. The axle 11 is provided with tractor wheels 13 while the axle 12 is provided with wheels 14. The tractor is also provided with a belt wheel 15, which is driven by mechanism not shown or described as this forms no part of my present invention.

My improved device comprises frame members 16, one of which is placed at each side of the body portion of the tractor and above said axles and inside of the wheels, the rear end of each of said members 16 being provided with U-bolts 17 designed to rest in a detachable sleeve member 18 secured to the axle 11. This U-bolt is so mounted that the free end of the lever 16 may be raised or lowered as hereinafter to be described.

The members 16 extend beyond the front axle 12, each being provided with a downwardly and forwardly extending portion 19 which terminates in a forwardly extending portion 20, which is again provided with a downwardly extending portion 21, the said portion 21 having a forwardly extending end member 22.

These members 16 are arranged parallel with each other and are designed to have pivoted in the forward ends of the members 22, tapering bars 23. These bars 23 are designed to be rigidly secured to the bottom of a scoop 24, this scoop 24 being opened at its front and top. The pivot portion of the members 22 and 23 rests substantially beneath the center of gravity of the scoop when it is filled. A back 25 of said scoop is designed to rest adjacent and slightly ahead of the member 21, as clearly shown in Figures 2 and 3.

The scoop 24 should be set as close to the front axle as is practical in order to give clearance so as to overcome as much overhanging as possible as too much overhanging will cause the rear end of the tractor to be elevated when the scoop is loaded.

For elevating and operating the scoop, I have provided the following mechanism:

Secured to the top of the gear casing 26 of the tractor, I have provided a bearing member 27 which is secured to said casing by means of bolts 28. The shape of this bracket 27 will have to be different on different makes of tractors so that it may be adapted to be connected to bolts that are already in the tractor frame. Rotatively mounted in the bearing 27, I have provided a shaft 29 having a belt wheel 30 on one end, a drum 31 adjacent to the inner side of said belt wheel and a drum 32 on the opposite end of said shaft. All of these members are rigidly secured to the shaft. The inner head member of the drum 32 is provided with ratchet teeth 33 which are designed to be engaged by a pawl 34 mounted in a bearing 35 extended from the bearing 27. This ratchet 34 is provided with a handle 36 for the purpose of releasing said ratchet when it is so desired. The belt wheel 30 is mounted immediately above the belt wheel 15, the two said wheels being operatively connected by means of a belt 37, the said wheels being formed with grooves for the purpose of receiving said belt so that the said belt may be run loosely when the machine is not in operation without coming off.

Adjacent to one side of the belt 37, I have provided a belt tightener wheel 38 mounted on the lever 39 and pivoted at 40. The lever 39 is provided with an upwardly extending hand lever 41 so arranged that as the said lever 41 is moved rearwardly, the belt 37 will be tightened and the wheel 30 rotated through the driver 15.

Secured to the forward frame of the tractor adjacent to the forward end of the engine, I have provided a bearing 42, which may be secured in position by bolts 43. This bearing is designed to receive a transverse rock shaft 44, each end of the shaft 44 being provided with a lever 45 having an upwardly extending arm 46 and a downwardly extending arm 47. Each of the arms 47 is provided at its lower end with a pivoted link 48 which is extended forwardly to a point substantially vertically above the pivot centers of the members 22 and 23, and a slight distance above the scoop 24.

The free ends of the members 48 are provided with a transversely arranged shaft 49 which is of a length slightly greater than the width of the scoop. Each end of said shaft 49 is provided with a downwardly extending link 50, the lower end of each of which is pivotally connected to an adjacent side member of the scoop 24 by means of a pivot 51 which is located slightly above and back of the pivot of the members 22 and 23, as clearly shown in Figure 1.

The upper ends of the arms 46 are provided with a transversely arranged shaft 52, each end of which is provided with a pivoted link 53, the lower end of each of said links being pivotally mounted to the shaft 49, as clearly shown in Figures 1 and 2. The shaft 52 is provided with a set of sheaves 53 near each end inside of the arms 46. Secured to each of the forwardly extending members of the bracket 27, I have provided a sheave 54 substantially in line with the sheaves 53.

Rigidly secured to the bracket member for the sheave 54, I have provided one end of a rope 55. This rope is designed to pass under one of the sheaves 53 and returned to the sheave 54, thence back to the second sheave 53, and has its other end mounted on a drum 32 in such a manner that as the drum 32 is operated, the shaft 52 will be drawn toward said drum, which in turn will cause the lower end of the members 47 to be advanced together with the link 48. The shaft 49 will be elevated due to the link connections 53. This will in turn cause the scoop to be elevated, as will hereinafter be more fully set forth.

It will be seen that on account of the position of the pivot 51 relative to the pivot of the members 22 and 23, that the scoop 24 would be dumped by the elevating movement just described.

For locking the scoop in its normal position, I have provided hooks 56 which are designed to engage the upper edge of the member 25, and having their lower ends pivotally connected to the inside of the members 20 and 21. These hooks are held against a forward movement by means of pins 57 engaging a downwardly projecting lug 58 from said hooks, best shown in Figures 3 and 4. For releasing the hooks, I have provided a shaft 59 pivotally mounted on the back side of the plate 25 by brackets 60, and inside of the hooks 56 secured to the shaft 59 beneath each of the hooks 56. I have provided a cam 61 so arranged that when in one position of its movement, the hooks will be permitted to engage the top edge of the plate 25, and when in another position of its movement the hooks will be forced backward to disengage the top edge of said plate. For yieldingly holding the cam 61 to its normal position, I have provided a spring 62, one end of which is connected to the shaft 59 while the other rests against the plate 25. The movement of said cam is limited in one direction by means of a pin 63 carried by the shaft 59 and which engages the said plate 25.

Secured to one end of the shaft 59, I have provided a hook shaped cam 64 designed to be engaged by a hook 65, one end of which is pivotally connected to a lever 66, which is in turn pivoted to the member 20. The upper end of the lever 66 is provided with a rod 67 which extends rearwardly and is operatively connected to a hand operated lever 68.

Thus it will be seen that as the hand lever 68 is moved rearwardly, the hook 65 will be moved rearwardly through the lever 66, which will cause the hook shaped cam 64 to be rotated and with it the shaft 59. This in turn will cause the cam 61 to be rotated against the action of the spring 62, and the hooks 56 released from the upper edge of the plate 25. When the hooks 56 have been released from the upper edge of the plate 25, the scoop will assume a vertical position substantially as shown in dotted lines in Figures 1 and 3.

To return the scoop to its normal position, I have provided a link 69 which is pivoted to one of the side plates of the scoop 24 near its bottom and back edge. The upper end of the link 69 is provided with a slot 70 which is designed to receive a pin 71 projecting laterally from one side of the hook member 65. When the scoop has assumed the position shown in dotted lines in Figure 3, the link 69 and the hook 65 will assume a position in alinement in such a manner that the lever 68 may be moved rearwardly, which will cause the scoop to be returned to its normal position. The slot 70 permits the pin 71 to move slightly therein so that the hook 65 may engage the hook 64.

By this arrangement, it will be seen that a single lever 68 may be employed to both unlock the scoop and return it to its normal position of movement.

The practical operation of my device is substantially as follows:

Assuming that the mechanism above described has been mounted on the tractor and that the scoop is in the position shown in Figure 1, and that it is desired to fill the scoop, the operator will advance the scoop into the material by manipulating the gear mechanism for driving the tractor wheels 13. After the scoop has been filled, the handle 41 is grasped and moved rearwardly which will cause the belt tightener 38 to engage the belt 37, and the wheel 30 will be rotated. This will cause the drums 32 to be rotated and their respective ropes to be wound thereon. This will in turn cause the shaft 52 to be drawn toward the shaft 29, and the scoop 24 to be elevated to a position shown in dotted lines in Figure 1. The pawl 34 of the ratchet 33 will then hold the load in its elevated position.

The tractor may then be driven together with a load to any desired point, such for instance as a fill for bridge abutments or the like. The scoop may be moved to a position over the edge of the bank, after which the lever 68 will be moved rearwardly causing the cams 61 to force the hooks 56 out of engagement of the top edge of the plate 25.

In this connection, it will be noted that the load is suspended by means of the pivots 51, and when the load is in the position shown in dotted lines in Figure 1, the center of gravity will be slightly back of the said pivot center. This will permit the hooks 56 to be easily disengaged with the top edge of the plate 25, but the weight of the members 16, 20 and 22 is suspended from the pivotal point slightly ahead of the pivot 51, which is sufficient to change the center of gravity of the load to the forward side of the pivot 51, which is, of course, the true center of gravity, and the scoop will be dumped.

After the said scoop has been dumped, the lever 68 is again grasped and pulled rearwardly which will cause the scoop to assume its normal position as before described.

I am aware of the fact that other scoop mechanisms have been pivotally mounted to tractors, but the arm members which take the place of the arm 16 of my device are pivoted at a point near the forward end of the tractor in such a manner that as the scoop is elevated, the scoop will be thrown ahead or to a greater overhanging position. This makes it impossible with a tractor of the light farm type to use a scoop of sufficient size to be practical, due to the fact that the weight in the scoop will elevate the rear axle of the tractor due to the excessive overhanging. With my device the pivots of the member 16 are on the rear axle, the said arm 16 being of such a length that as the scoop is elevated, it moves in substantially a vertical plane with a slight forward movement.

By mounting the shaft 44 near the forward end of the tractor and at a point considerably above the shaft 49, I have provided means through the frame construction consisting of the arms 46, 48 and 53ᵃ which will cause the shaft 49 to be moved to a point substantially vertically above the pivot 51 when the scoop is in its elevated position, as clearly shown in dotted lines in Figure 1, so that the lifting strain on the scoop is in substantially a vertical line before the scoop is dumped. As the scoop is dumped, the link will assume a slightly inclined position indicated by the numeral 72. This will assist in returning the scoop to its normal position after it has been dumped, but the inclination of the link 53ᵃ is not great enough to materially hinder in the dumping.

Thus it will be seen that I have provided a device for gathering and delivering material, of simple, durable and comparatively inexpensive construction which is adapted to be attached to a light farm tractor, and provided with a very simple and inexpensive operating device for operating and controlling the scoop.

I claim as my invention:

1. The combination of a tractor having supporting axles and a drive member, with a scoop, arms pivoted to the rear axles and also pivoted centrally beneath the said scoop, a frame pivoted to the forward end of said tractor at a point considerably above the said scoop, said frame being provided with a pivot member overhanging the central portion of said scoop, links pivoted to said overhanging pivot member and with said scoop, means driven by said drive member for swinging said frame to elevate and lower said overhanging pivot member, the said links being designed to rest substantially in a perpendicular position when either elevated or lowered, means for dumping said scoop and means for returning the scoop to its closed position.

2. The combination of a tractor having a front and rear axle and a drive member, with a scoop, arms pivotally mounted on the rear axle and designed to overhang the front axle, and to be pivoted centrally and beneath the bottom of said scoop, a frame pivotally connected near the front end of the engine at a point considerably above the scoop when it is on the ground, said frame being provided with a forwardly overhanging pivot member substantially vertically above the pivot members of said scoop and at a point below the pivot members of said frame, links pivotally connected to said overhanging pivot members and pivoted to said scoop at a point slightly back of the scoop pivot member, means actuated from said drive member for moving the overhanging pivot member of said scoop upwardly and slightly forward to elevate said scoop, means for locking said scoop in its closed position, and means for releasing said locking means, and means for controlling said driving means.

3. The combination of a traction engine having a drive member, a scoop, parallel arms detachably pivoted to said tractor and projecting forwardly and beyond the front end of said tractor and beneath the bottom of said scoop, each of said arms being provided with tapering pivot members, said pivot members being secured beneath the bottom of said scoop, the pivots of said members resting substantially centrally beneath the bottom of said scoop, means for locking the scoop against pivotal movement on said arms, means driven from the drive member for elevating and lowering said scoop, and means for dumping said scoop when it is in its elevated position.

4. The combination of a tractor engine having supporting axles and a drive pulley, with a scoop, pivoted members having one of their ends pivotally mounted on the rear axle of said tractor and their other ends pivotally connected to said scoop, means for locking the scoop in a filling position relative to said arms, means for unlocking the scoop to permit it to dump, a pivoted frame for elevating and lowering said scoop, means for oscillating said frame comprising a series of drums each designed to operate the fall member of a block and tackle which is operatively connected with said pivoted frame, a shaft for supporting said drums, a belt wheel on said shaft, a belt loosely connected to said drive pulley and said belt wheel, and means for tightening said belt.

5. In a device of the class described, a support, horizontal and parallel arms pivotally mounted on said support, said arms being provided with downwardly extending portions and a forwardly extending portion at the lower end of said downwardly extending portion, a member pivoted to the forward end of the last said forwardly extending portion, a scoop secured to the upper side of said pivotally mounted members so that the said pivotally mounted members are near the transverse central portion of the bottom of said scoop, depending links pivotally connected to the sides of said scoop at a point slightly to the rear of the first said pivoted members, means for elevating and lowering said links so that the said links will rest in a substantially vertical position in either of its positions of movement, a hook device pivoted to the downwardly extending portion of the said parallel arms designed to engage the back edge of said scoop, a shaft pivotally mounted on the back end of said scoop horizontally beneath said hooks, a hook member on the outer end of said shaft, a lever pivoted to one of said parallel arms and adjacent to the last said hook, a releasing hook pivoted to the last said lever designed to engage the hook on the end of said shaft to rotate said shaft when the said lever is operated, the link pivoted to said scoop having a slot at its free end, a pin through said slot and operatively connected to said releasing hook, substantially as described and for the purpose stated.

Des Moines, Iowa, March 24, 1921.

ALEXANDER LAURIE.